United States Patent
Momose et al.

(10) Patent No.: US 6,870,983 B2
(45) Date of Patent: Mar. 22, 2005

(54) OPTICAL SWITCH, ELEMENT THEREFOR, AND OPTICAL SWITCHING METHOD

(75) Inventors: Hideto Momose, Hitachiohta (JP); Yuuichi Sawai, Hitachi (JP); Mitsutoshi Honda, Hitachi (JP); Takashi Naitou, Mito (JP); Hiroyuki Akata, Hitachi (JP); Tsukasa Ookawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 97 days.

(21) Appl. No.: 10/447,146

(22) Filed: May 29, 2003

(65) Prior Publication Data

US 2004/0105612 A1 Jun. 3, 2004

(30) Foreign Application Priority Data

Nov. 29, 2002 (JP) ........................................ 2002-347377

(51) Int. Cl.$^7$ ............................................... G02B 6/26
(52) U.S. Cl. ............................................ 385/16; 385/12
(58) Field of Search ................................ 385/12, 16–24; 359/321

(56) References Cited

U.S. PATENT DOCUMENTS 5,315,673 A * 5/1994 Stetter et al. .................. 385/12

* cited by examiner

Primary Examiner—Phan T. H. Palmer
(74) Attorney, Agent, or Firm—Crowell & Moring LLP

(57) ABSTRACT

An optical switch, in which focal position of beams is adjusted to provide a high switching efficiency and a high stability in action without increasing a light source output of a control light, comprising a condensing means for making a signal light and a control light convergent and incident upon a nonlinear optical thin-film and wherein irradiation of the control light causes a change of the nonlinear optical thin-film in refractive index to thereby change the signal light into a transmitted light or a reflected light to take out the same as an output signal.

23 Claims, 3 Drawing Sheets

OPTICAL SWITCH, ELEMENT THEREFOR, AND OPTICAL SWITCHING METHOD

BACKGROUND OF THE INVENTION

1. Field of the Invention

The present invention relates to a novel optical switch making use of the excitation phenomenon of a nonlinear optical thin-film caused by a control light to rapidly switch optical paths for a signal light containing electronic information and to perform switching of an optical signal, an element therefor, and an optical switching method.

2. Related Art

Non-patent document 1: Nikkei Electronics, Aug. 13, 2001
Patent document 1: JP-B-3-24650
Patent document 2: JP-A-8-82811
Patent document 3: JP-A-2000-314901

With the development of an information-oriented society, a large amount of electronic information is communicated on optical fiber networks, and fast response is demanded for switching elements, which serve as "point of intersection" for disposing of optical signals between networks as interconnected. Conventionally, switching elements of a optical-electrical-optical type are general to once convert an optical signal into an electric signal to convert the same again into an optical signal to send the same to a network being a destination of transmission. Since parts cost and power consumption required for photoelectric conversion are increased with an increase in information throughput, however, attention has been given to optical switches, which dispenses with conversion into electric signals and can perform routing switching of an optical signals directly. With such optical switches, an optical mechanism performs switching not to be dependent upon data transmission rate, and so it is easy to deal with transmission rate of at least 10 G bit/second, with which an electric switch is difficult to deal.

Optical switches include a mechanical type MEMS (Micro Electro Mechanical Switch) making use of a micromirror and an electrostatic actuator, and planar waveguide type switch, which are described in Non-patent document 1. Switches have been developed to have a switching time in the order of milliseconds.

Meanwhile, switches making use of an optical effect to perform a very high speed switching include an optical switch described in Patent document 1, in which a waveguide is provided on an electrooptic crystal made of lithium niobate, or the like, and switching is performed by a change in refractive index, caused upon application of an electric field. With such optical switch, application of an electric field causes a change in the refractive index of the electrooptic crystal and adjusts the refractive indexes of surrounding materials so that a signal light incident obliquely upon the electrooptic crystal is put on a condition of total reflection and on a condition of non-total reflection, whereby optical paths are switched. Also, optical switches are known from Patent documents 2 and 3, which perform a very high speed switching in the order of femtoseconds owing to the nonlinear optical effect caused not by an electric signal but by a control light.

In order to materialize optical switches enabling a very high speed switching, it is favorable to make use of a refractive index change caused by the nonlinear optical effect resulted from electronic excitation, which exhibits fast response in the order of picoseconds. Since an amount of refractive index change caused by the nonlinear optical effect increases with an increase in energy density of a control light 4 (exciting light), it is necessary to increase the energy density of the control light 4 in order to obtain an adequate and stable switching action. As measures for this, measures for increasing a light source output of a control light, and measures for converging the control light 4 are conceivable.

When the former measures are adopted, an absolute energy amount being input is increased to weaken the energy saving quality of an element. Further, when a part of the energy is converted into heat in the course of energy relaxation after excitation to be reserved and radiational cooling cannot accommodate such heat reserve, there is a possibility that an element is raised in temperature. Since temperature rise also changes an optical characteristics of an nonlinear optical thin-film, there is a fear of weakening stability of a switching action.

In this manner, the latter measures for converging the control light 4 is favorable in view of energy saving quality and stability in performance. In the case of pulse excitation in the order of nanoseconds and picoseconds, an energy density in the range of GW per square meter is necessary in order to obtain an adequate nonlinear optical effect. In the case of using laser having an output in a convenient range of mW as a source of the control light 4, the light is converged to a size of $\mu$m to thereby materialize the energy density. In examining refractive index changes of a metallic oxide thin film, which exhibits an nonlinear optical characteristics, in a wavelength region of a signal light 3, the changes being caused by the pulse control light 4 of with femtoseconds laser, attenuation changes in the order of nanoseconds were observed in addition to response in the order of picoseconds, which was considered to be resulted from electronic excitation/relaxation phenomenon.

The latter attenuation changes in the order of nanoseconds are considered to be a phenomenon due to thermal relaxation, and in connection with this phenomenon, heat transfer affects surroundings of a portion being irradiated. Meanwhile, since a region, in which a refractive index changes in large amount and the former electronic excitation/relaxation takes effect, is restricted to a local spot irradiated by the control light 4, it has proved from experiments that a signal switching efficiency is sharply lowered when overlapping of a spot of the control light 4 and a spot of the signal light 3 is inadequate. That is, the signal light 3 getting out of the spot of the control light 4 behaves in the same manner as before excitation to be taken out as a background irrespective of presence and absence of excitation, so that switching is decreased in contrast ratio.

SUMMARY OF THE INVENTION

An object of the invention is to provide an optical switch, in which beams are adjusted in focal position to provide a high switching efficiency and a high stability in action without increasing a light source output of a control light, an element therefor, and a switching method.

The invention provides an optical switch comprising condensing means for making a signal light and a control light convergent and incident upon a nonlinear optical thin-film and wherein irradiation of the control light causes a change of the nonlinear optical thin-film in refractive index to thereby change the signal light into a transmitted light and a reflected light, either of which is taken out as an output signal.

The condensing means performs convergence so that the signal light is covered by the control light on the nonlinear optical thin-film, and is provided with a condensing optical system for converging a beam of a control light so as to attain an energy density required for a control light spot on the nonlinear optical thin-film to give rise to a predetermined refractive index change, in an optical switch for making the signal light and the control light incident upon the nonlinear optical thin-film, and the condensing optical system is set such that a spot of the signal light on the nonlinear optical thin-film is sized to be equal to or smaller than a spot of the control light and completely included in the spot of the control light.

It is desired that a nonlinear optical thin-film for use in optical switch shows small sorption at a wavelength of the signal light. Meanwhile, since the control light needs interaction for excitation of the thin film and is needed to have some absorption intensity. In the case of excitation due to photon absorption, an exciting light absorption intensity at the time of irradiation of the signal light is increased. The signal light and the control light must be different from each other in the interaction thereof with a nonlinear optical constant, and a refractive index of an optical element used is different between the signal light and the control light since wavelength is different therebetween.

Also, with an optical system, in which a signal light and a control light are joined to be irradiated on a nonlinear optical thin-film along the same axis, the signal light comes to a focus at the front side of the control light provided that a refractive index of an element converging the joined light on the nonlinear optical thin-film is larger at a wavelength of the control light than at a wavelength of the signal light, but all the signal light can be covered by the control light through an optical design, in which the control light comes to a focus at the back of an incident surface on the nonlinear optical thin-film.

Also, conversely, provided that a refractive index of the condensing element is smaller at a wavelength of the control light than at a wavelength of the signal light, the control light comes to a focus at the front side of the signal light, but it is possible to realize the above in the same manner through an optical design, in which the control light comes to a focus at the front of an incident surface on the nonlinear optical thin-film.

Further, in an optical switch configured such that a signal light and a control light are joined to be incident upon a nonlinear optical thin-film along the same axis, waveguides are arranged to be gradually decreased in diameter toward the nonlinear optical thin-film, whereby a spot of the signal light on the nonlinear optical thin-film can be made to correspond in size to a spot of the control light.

Also, in an optical switch configured such that a signal light and a control light are made incident obliquely upon a nonlinear optical thin-film along different axes, the control light is made incident at a larger angle relative to a normal line to the nonlinear optical thin-film than the signal light is, whereby all the signal light can be covered by the control light.

Also, in an optical switch configured such that a control light is made incident upon a nonlinear optical thin-film at a smaller angle than a signal light is, a film thickness of the nonlinear optical thin-film is desirably made smaller than a major axis of a spot of the control light on a surface of the nonlinear optical thin-film. This is intended for avoiding a situation, in which the obliquely incident signal light comes out of an irradiation region of the control light when the film thickness is large.

Also, no matter whether the signal light and the control light are joined together, or the lights are conducted to the nonlinear optical thin-film by way of separate optical paths, it is desired that a fiber for conducting the signal light is smaller in core diameter than a fiber for conducting the control light in the case of connection with optical fibers.

Also, in an optical switch, in which both outputs of a transmitted light and a reflected light are taken out to be used, energy saving, avoidance of heat reserve, and a stable action can be realized by designating a usage, in which an output destination of the transmitted light being an output destination when a control light is not made incident is assigned to an output destination where data are frequently taken out.

Further, avoidance of heat reserve, and a stable action can be realized by mounting a thermo-sensitive on a switch and providing a mechanism for cooling an element during a term in which temperatures above a predetermined temperature are detected.

The invention provides an optical switching element comprising high refractive-index transparent materials provided on both sides of a nonlinear optical thin-film with the nonlinear optical thin-film therebetween, an incident port which is provided on one of the high refractive-index transparent materials and through which a signal light and a control light are made incident upon the nonlinear optical thin-film, and output ports which are provided on the other of the high refractive-index transparent materials and through which the signal light is taken out as output signals in the form of a transmitted light and a reflected light owing to change of the nonlinear optical thin-film in refractive index, which is caused by irradiation of the control light.

Preferably, the incident port comprises condensing means for making the signal light and the control light incident perpendicularly upon an incident surface of the high refractive-index transparent materials, the output port for outputting the reflected light is provided on an incident surface side of the high refractive-index transparent materials, the output port for outputting the transmitted light is provided on the other side of the high refractive-index transparent materials, and the both output ports are provided perpendicular to the output surfaces to have parallel beams of light output.

Preferably, the incident port is provided in a position to make the signal light and the control light incident obliquely upon the nonlinear optical thin-film, the high refractive-index transparent materials comprise the condensing means for making the signal light and the control light incident obliquely upon the nonlinear optical thin-film along different optical axes, and the control light is made incident at a larger angle relative to a normal line to the nonlinear optical thin-film via the condensing means than the signal light is.

Preferably, the high refractive-index transparent materials comprise the condensing means for making the control light incident at a smaller angle relative to a normal line to the nonlinear optical thin-film than the signal light is, and a film thickness of the nonlinear optical thin-film is made smaller than a major axis diameter of a spot of the control light on a surface of the nonlinear optical thin-film.

Preferably, optical fibers are connected to one of the high refractive-index transparent materials to permit the signal light and the control light to be incident upon the nonlinear optical thin-film, and a fiber for inputting the control light is larger in core diameter than a fiber for inputting the signal light.

The invention provides an optical switching element comprising a nonlinear optical thin-film, optical substrate transparent materials provided on both sides of the nonlinear optical thin-film with the nonlinear optical thin-film therebetween, an incident port which is provided on one of the optical substrate transparent materials and through which a signal light and a control light are made incident upon the nonlinear optical thin-film, and output ports which are provided on the other of the optical substrate transparent materials and through which the signal light is taken out as output signals in the form of a transmitted light and a reflected light owing to change of the nonlinear optical thin-film in refractive index, which is caused by irradiation of the control light, and one of the optical substrate transparent materials is provided with a waveguide, by which lights composed of the signal light and the control light are gradually decreased in diameter toward the nonlinear optical thin-film, the other of the optical substrate transparent materials being provided with a waveguide, through which the transmitted light is output.

Preferably, the optical switching element according to the invention comprises temperature detection means and cooling means provided on at least one of lamination surface sides of the high refractive-index transparent materials or the optical substrate transparent materials, or on a side except the incident side and the output side.

Also, the invention provides an optical switching method comprising making a signal light and a control light incident upon a nonlinear optical thin-film, and taking out a transmitted light and a reflected light of the signal light as output signals from the other of high refractive-index transparent materials owing to change of the nonlinear optical thin-film in refractive index, which is caused by irradiation of the control light, and the nonlinear optical thin-film is provided between high refractive-index transparent materials, the signal light and the control light are made incident upon one of the high refractive-index transparent materials, a transmitted light or a reflected light of the signal light is taken out as an output from the other of the high refractive-index transparent materials.

DESCRIPTION OF THE PREFERRED EMBODIMENTS (First Embodiment)

Figure 1:
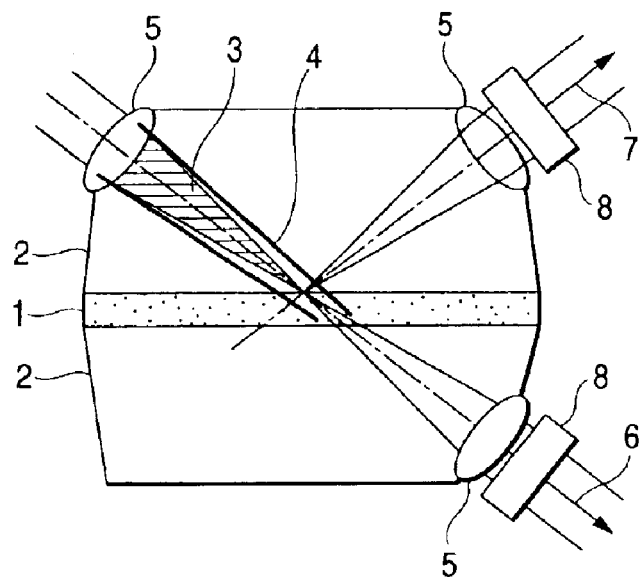
FIG. 1 is a cross sectional view showing an optical switch according to the invention and its optical path.

FIG. 1 is a cross sectional view showing an optical switch according to the invention and its optical path. In the embodiment, a nonlinear optical thin-film 1 is interposed by high refractive-index transparent materials 2, and a signal light 3 and a control light (exciting light) 4 are joined and thereafter caused by a convergent optical element 5 to be convergently and obliquely incident on the nonlinear optical thin-film 1 through the high refractive-index transparent material 2. In the case where optical fiber is used as means for joining the signal light 3 and the control light 4, it is possible to use a coupler. Also, a biprism may be used to align optical axes. Here, in the case where a refractive index of the convergent optical element 5 is smaller at a wavelength of the signal light 3 than at a wavelength of the control light 4, the signal light 3 comes to a focus at the front side of the control light 4 as shown in FIG. 1. At this time, an f value and position of the convergent optical element 5 are designed so that the control light 4 comes to a focus at the back of the nonlinear optical thin-film 1.

The convergent optical element 5 may be formed directly on the high refractive-index transparent material 2 or in the vicinity thereof. Both the signal light 3 and the control light 4 are formed to be made incident perpendicularly on a center of an incident surface of the high refractive-index transparent material 2. Also, the convergent optical element 5 may be formed directly on the high refractive-index transparent material 2 or in the vicinity thereof at the front side of a transmitted light 6 and a reflected light 7. The transmitted light and the reflected light are made to be incident perpendicularly on centers of incident surfaces of the high refractive-index transparent material 2.

For the signal light 3, 1550 nm being general in optical communication is used. For the control light 4, a wavelength is selected, which can efficiently excite the nonlinear optical thin-film 1. Here, the nonlinear optical thin-film 1 and the high refractive-index transparent material 2 are selected so that the relationship between a refractive index n1 of the high refractive-index transparent material 2 and a refractive index n2 of the nonlinear optical thin-film 1 is made n1≦n2 at the wavelength of the signal light 3. A thin film, in which nanocrystals of cobalt and iron oxides are dispersed, can be used for the nonlinear optical thin-film 1.

A high refractive-index glass containing lead, silicon nitride, ITO, and the like are listed to make the high refractive-index transparent materials 2, and one of the materials has a thickness of about 1 mm. Incident angles of the signal light 3 and the control light 4 from the high refractive-index transparent material 2 to the nonlinear optical thin-film 1 are larger than a critical angle θc found from a refractive index n2' of the nonlinear optical thin-film 1 after excitation and a formula sine θc=n2'/n1(n1>n2').

Here, in the case where n2' is decreased to 71% of n1, θc=45°, in the case where n2' is decreased to 87% of n1, θc=60°, in the case where n2' is decreased to 94% of n1, θc=70°, and in the case where n2' is decreased to 97% of n1, θc=77°. In this manner, in order to make an incident angle small, a large nonlinear optic effect is necessary. In addition, a bandpass filter 8 is provided at the front side of the transmitted light 6 and the reflected light 7 to permeate only the wavelength of the signal light 3 therethrough, thus removing the control light 4 and fluorescence.

The nonlinear optical thin-film 1 is made of, for example, a thin film (refractive index of 2.1) with nanocrystals of iron oxides dispersed in glass, the thin film being a transparent material to permeate the signal light 3 therethrough and to absorb the control light 4, and excited by irradiation of the control light 4, the material being smaller in refractive index than the high refractive-index transparent materials 2. The thin film having a thickness of several µm was deposited on an incident side of laser beam by using a sputtering apparatus and a target of iron oxide. When a silicon nitride film (refractive index of 2.05) was used to make the high refractive-index transparent materials 2 and the signal light 3 was made incident at an incident angle 70°, a major part of the light was permeated with a ratio of a reflected light intensity to a transmitted light intensity being approximately 5:95 on the condition that the control light 4 was not included. Here, when a control light 4 having a wavelength of 780 nm was superposed on the signal light 3 at an energy density of 2 GW/m² to be irradiated, the refractive index for the signal light 3 was decreased to 1.8 due to the nonlinear optic effect. At this time, total reflection was generated at an interface between high refractive-index transparent materials 2 and the nonlinear optical thin-film 1, a ratio of a reflected light intensity to a transmitted light intensity was made 100:0 and thus the ratio of light intensities was reversed from that before the excitation, so that a switching motion was confirmed.

Meanwhile, when a convergent optical element 5, in which a refractive index was smaller for the signal light 3 than for the control light 4, was used and a depth of focus and a position of the convergent optical element 5 were set so that the control light 4 comes to a focus forwardly of the nonlinear optical thin-film 1, a ratio of a reflected light intensity to a transmitted light intensity before excitation was 5:95 being the same as described above, but a ratio of a reflected light intensity to a transmitted light intensity after excitation was made 52.5:47.5 to lead to degradation in contrast. The reason for this is considered to reside in that since a spot area of the signal light 3 of 50% extended beyond a spot area of the control light 4, the extended portion behaves optically in the same manner as before excitation.

For the transmitted light 6 and the reflected light 7, the convergent optical element 5 may be formed directly on the high refractive-index transparent material 2 or in the vicinity thereof, and both the transmitted light and the reflected light are made to outgo perpendicularly from centers of incident surfaces of the high refractive-index transparent material 2, the both lights making parallel rays to outgo.

As described above, in the case where a refractive index of the convergent optical element 5 was smaller at the wavelength of the signal light 3 than at the wavelength of the control light 4, all portions, through which the signal light 3 passed, could be irradiated (so the refractive index changed) by the control light 4 by designing a f value and position of the convergent optical element 5 so that the control light 4 comes to a focus at the back of the nonlinear optical thin-film 1, whereby it becomes possible to switch over optical signals with a high contrast ratio.

According to the embodiment, energy density is increased by narrowing beams without increasing a light source output of the control light, whereby energy saving and heat reserve achieve restriction on temperature rise of the nonlinear optical thin-film to provide a high stability in action. Also, according to the embodiment, all portions, through which the signal light passes, can be irradiated by the control light, so that a high switching efficiency can be ensured.

(Second Embodiment)

Figure 2:
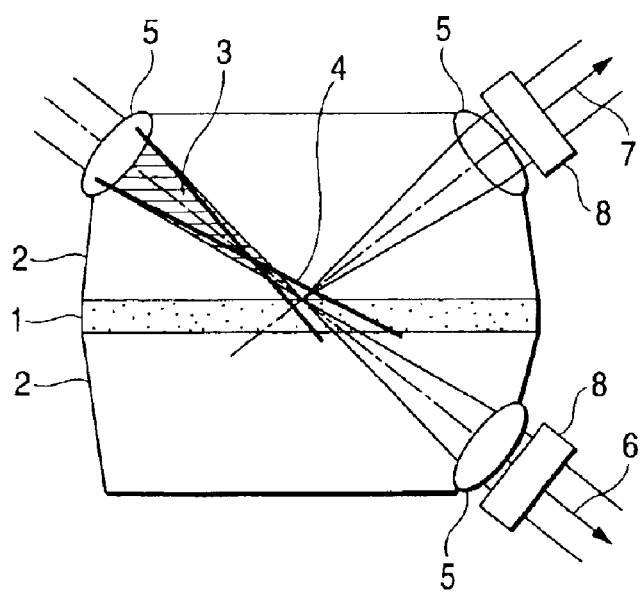
FIG. 2 is a cross sectional view showing an optical switch according to a further example of the invention and its optical path.

FIG. 2 is a cross sectional view showing an optical switch according to the invention and its optical path. In the same configuration as that in the first embodiment, a convergent optical element 5, in which a refractive index is larger for the signal light 3 than for the control light 4, is used. As shown in FIG. 2, the signal light 3 comes to a focus to rearward of the control light 4. Hereupon, the same effect as that in the first embodiment is produced by setting a depth of focus and a position of the convergent optical element 5 so that the control light 4 comes to a focus at the front side of the nonlinear optical thin-film 1, and making a spot of the signal light 3 on the nonlinear optical thin-film 1 smaller than a spot of the control light 4, and further switching with a high contrast ratio is made possible since all portions, through which the signal light 3 passes, are covered and irradiated (so the refractive index changes) by the control light 4 and the whole signal light 3 is influenced by ON/OFF of the control light 4 to make a response. Also, the same effect as that in the first embodiment is produced in the embodiment.

(Third Embodiment)

Figure 3:
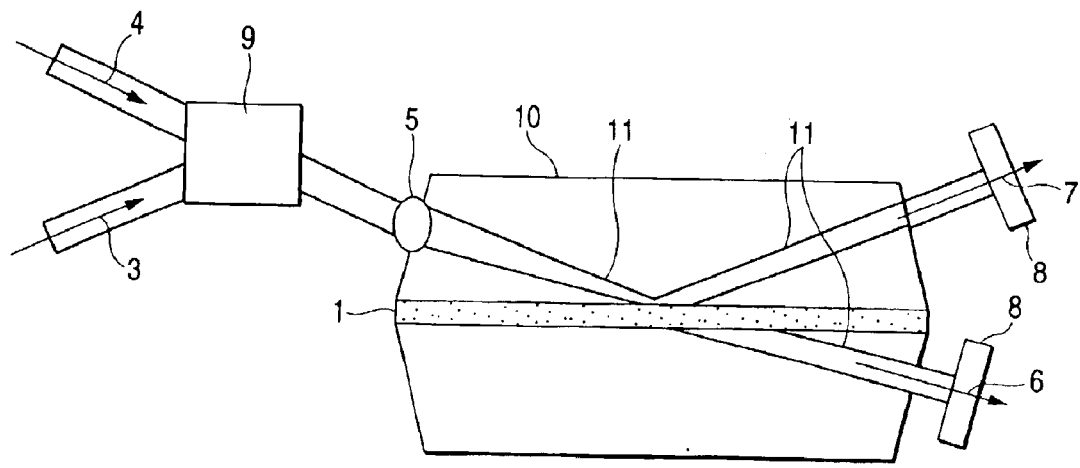
FIG. 3 is a cross sectional view showing an optical switch according to a still further example of the invention and its optical path.

FIG. 3 is a cross sectional view showing an optical switch according to the invention and its optical path. As shown in FIG. 3, the signal light 3 and the control light 4 are introduced by way of optical fibers to be joined together by a coupler 9, and an output light thereof is conducted through an optical fiber to waveguides 11 which are formed in an optical substrate transparent material 10. The waveguides 11, a refractive index of which is higher than that of the optical substrate transparent material 10, are formed by means of a processing, in which femtosecond laser is irradiated on the optical substrate transparent material 10 to change the irradiated portion in quality to make the same high in density. In particular, the waveguides 11 on an incident side are formed to be made small in diameter as it comes closer to the nonlinear optical thin-film 1, and a beam spot on the nonlinear optical thin-film 1 is formed to be narrowed in the order of $\mu$m, whereby the convergent optical element 5 can be dispensed with. Thereby, the control light 4 can have an energy density of the order of GW/m² on the nonlinear optical thin-film 1 and the signal light 3 and the control light 4 can correspond to each other in spot size and position on the nonlinear optical thin-film 1. The optical substrate transparent material 10 may be the same as the high refractive-index transparent material.

Thereby, all portions, through which the signal light 3 passes, can be irradiated (so the refractive index changes) by the control light 4 and the whole signal light 3 is influenced by ON/OFF of the control light 4 to make a response, so that switching with a high contrast ratio is made possible. The waveguides 11 for the reflected light 7 and the transmitted light 6 are shaped to diverge somewhat on an output side as shown in FIG. 3 and formed to make the lights substantially parallel immediately before they leave the optical substrate transparent material 10, and the optical substrate transparent material 10 can be formed by using a transparent material and irradiating a specific laser beam thereon. A material, which is subjected to irradiation of laser beam to make the waveguides 11 higher in refractive index than the optical substrate transparent material 10, is used. Both an incident port and output ports are formed to be made perpendicular to an incident surface and output surfaces. Also, the same effect as that in the first embodiment is produced in the embodiment.

(Fourth Embodiment)

Figure 4:
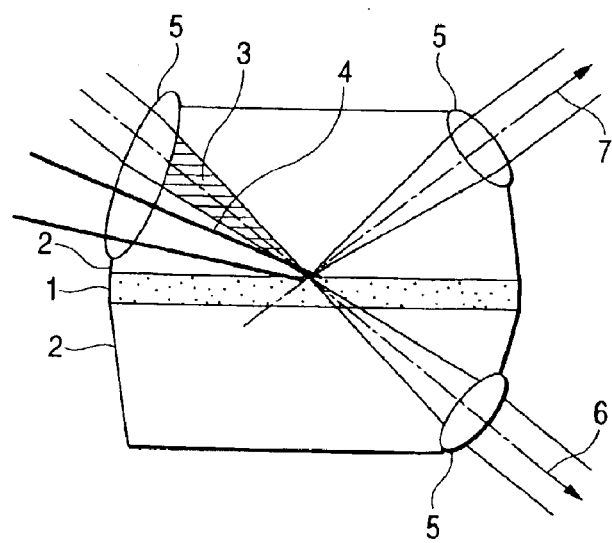
FIG. 4 is a cross sectional view showing an optical switch according to a further example of the invention and its optical path.

FIG. 4 is a cross sectional view showing a further optical switch according to the invention and its optical path. While in the first to third embodiments the signal light 3 and the control light 4 are joined together to tread the same optical axis to be made incident upon the nonlinear optical thin-film 1, the lights may be made incident along different optical axes to intersect each other on the nonlinear optical thin-film 1. Conventionally, in the case where the signal light 3 is made incident at a large incident angle because of the use of the condition of total reflection, an optical system, in which the control light 4 is made incident at a smaller incident angle than the above incident angle, is adopted, but the control light 4 is made incident at a large incident angle than that for the signal light 3 as shown in FIG. 4. The convergent optical element 5 makes both the signal light 3 and the control light 4 convergent on the nonlinear optical thin-film 1.

In the case where a refractive index of the convergent optical element 5 is smaller at the wavelength of the signal light 3 than at the wavelength of the control light 4, a f value and position of the convergent optical element 5 are designed so that the control light 4 comes to a focus at the back of the nonlinear optical thin-film 1. Conversely, in the case where a refractive index of the convergent optical element 5 is larger at the wavelength of the signal light 3 than at the wavelength of the control light 4, a f value and position of the convergent optical element 5 are designed so that the control light 4 comes to a focus at the front side of the nonlinear optical thin-film 1.

Further, by making the control light 4 incident at a larger incident angle than the angle at which the signal light 3 is made incident, a size of a spot of the signal light 3 on the nonlinear optical thin-film 1 is included in a size of a spot of the control light 4 whereby all portions, through which the signal light 3 passes, can be irradiated (so the refractive index changes) by the control light 4 and the whole signal light 3 is influenced by ON/OFF of the control light 4 to make a response, so that switching with a high contrast ratio is made possible.

In addition, since optical axes of the control light 4 and the signal light 3 are different from each other, a bandpass filter for removing the control light 4 can be in some cases omitted for the transmitted light 6 and the reflected light 7. In the case where fluorescence becomes an obstacle and in the case where a distance between the control light 4 and the signal light 3 are small after being outputted to make it difficult to receive only the signal light 3, however, there is a need of providing a bandpass filter as in the first and second embodiments. Also, the same effect as that in the first embodiment is produced in the embodiment.

(Fifth Embodiment)

By making an inner diameter of a core of an optical fiber for the signal light 3 than that of a core of an optical fiber for the control light 4 in the third embodiment, a size of a spot of the signal light 3 on the nonlinear optical thin-film 1 is made smaller than a size of a spot of the control light 4 whereby all portions, through which the signal light 3 passes, can be irradiated (so the refractive index changes) by the control light 4, so that switching with a high contrast ratio is made possible. Also, this approach is effective in both a system, in which the signal light 3 and the control light 4 are joined together, in the first and second embodiments and a system, in which the lights are individually made incident to intersect each other on the nonlinear optical thin-film 1.

(Sixth Embodiment)

Figure 5:
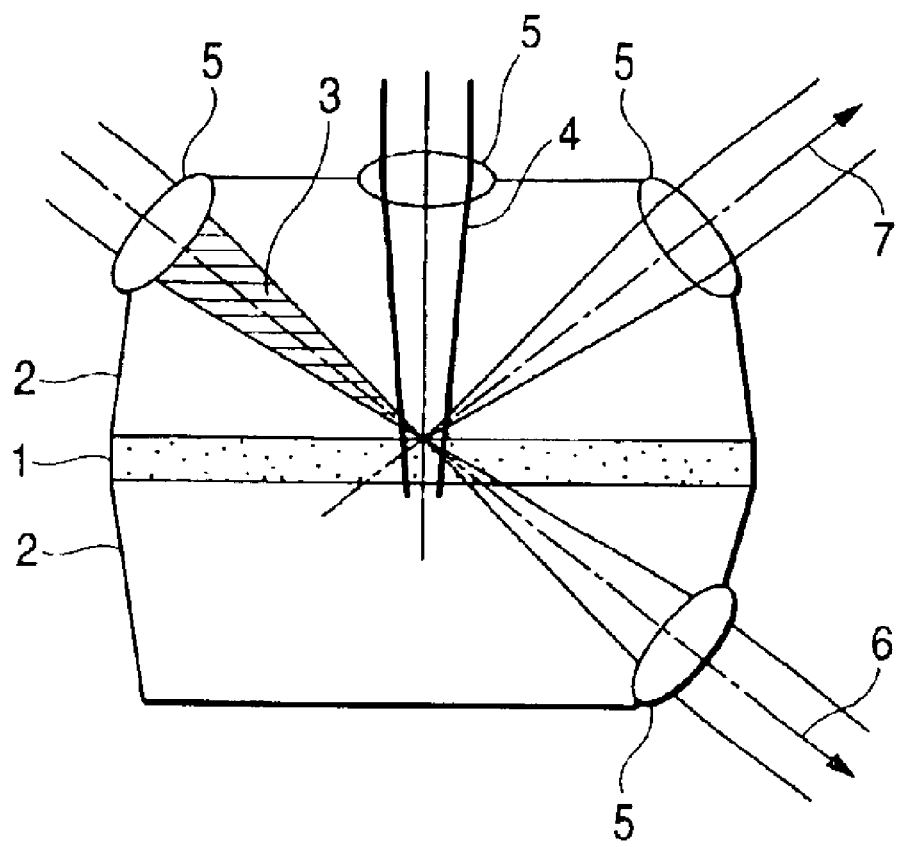
FIG. 5 is a cross sectional view showing an optical switch according to a still further example of the invention and its optical path.

FIG. 5 is a cross sectional view showing a still further optical switch according to the invention and its optical path. In the case where the control light 4 is made incident upon the nonlinear optical thin-film 1 at a small incident angle as shown in FIG. 5, the obliquely incident signal light 3 extends beyond the control light 4 when the film has a large film thickness, so that a decrease in efficiency is caused. By making a film thickness of the nonlinear optical thin-film 1 smaller than a major axis diameter of a spot of the control light 4 on the nonlinear optical thin-film 1, a high switching efficiency can be ensured. Also, the same effect as that in the first embodiment is produced in the embodiment.

(Seventh Embodiment)

In the optical switching elements according to the first to sixth embodiments, since it is unnecessary to input the control light 4 in the case where the control light 4 is made incident to have a signal taken out from an output of the reflected light and to have an output taken out from the transmitted light, a switching destination of high frequency in use is set on a side of the transmitted light in use of an optical switch whereby a stable action can be obtained in a condition of energy saving and less influence of heat reserve. Clear description of this in an instruction manual of the optical switch is effective.

(Eighth Embodiment)

In the optical switching elements according to the first to seventh embodiments, there is a fear that heat reserve, which is possibly caused by continuous irradiation of the control light 4, and an installation environment might raise the elements in temperature and make the action of the elements unstable. In the present embodiment, a temperature sensor, Peltier element for cooling, and an air-cooling fan are mounted on high refractive-index transparent materials 2 in a lower portion of the optical switch, or on the optical substrate 10 to perform Peltier cooling when an allowable temperature (for example, 80° C.) is exceeded. Thereby, even when temperature rises due to irradiation for a switching action, a cooling mechanism interlocking with detection of the temperature sensor is operated to thereby enable obtaining a stable action. The Peltier element for cooling can be provided on that side of the optical switch, which is a front or back surface relative to the front sides of the respective figures.

According to the invention, it is possible to provide an optical switch, in which beams are narrowed to increase the energy density without increasing a light source output of a control light, whereby energy saving and heat reserve achieve restriction on temperature rise of the nonlinear optical thin-film and a high switching efficiency can be realized and which is highly stable in action, an element therefor, and a switching method.

What is claimed is:

1. An optical switch comprising condensing means for making a signal light and a control light convergent and incident upon a nonlinear optical thin-film and wherein irradiation of the control light causes a change of the nonlinear optical thin-film in refractive index to thereby change the signal light into a transmitted light and a reflected light, either of which is taken out as an output signal.

2. The optical switch according to claim 1, wherein the condensing means performs convergence so that the signal light is covered by the control light on the nonlinear optical thin-film.

3. The optical switch according to claim 2, wherein the condensing means is set such that a spot of the signal light is smaller in size than a spot of the control light on a surface of the nonlinear optical thin-film.

4. The optical switch according to claim 1, wherein the nonlinear optical thin-film is provided between high refractive-index transparent materials.

5. The optical switch according to claim 4, wherein lights composed of the signal light and the control light are made incident upon the nonlinear optical thin-film via the condensing means along the same axis, and the condensing means comprises waveguides provided in the high refractive-index transparent materials to be gradually decreased in diameter toward the nonlinear optical thin-film.

6. The optical switch according to claim 1, wherein the signal light and the control light are passed through optical fibers to be made incident upon the nonlinear optical thin-film via the condensing means and a fiber for inputting the control light is larger in core diameter than a fiber for inputting the signal light.

7. The optical switch according to claim 1, wherein the signal light and the control light are made incident obliquely upon the nonlinear optical thin-film via the condensing means along different optical axes, and the condensing means is arranged such that the control light is made incident at a larger angle relative to a normal line to the nonlinear optical thin-film than the signal light is.

8. The optical switch according to claim 1, wherein the control light is made incident at a smaller angle relative to a normal line to the nonlinear optical thin-film via the condensing means than the signal light is, and a film thickness of the nonlinear optical thin-film is made smaller than a major axis diameter of a spot of the control light on a surface of the nonlinear optical thin-film.

9. The optical switch according to claim 1, wherein the transmitted light is an output destination in which data are frequently taken out.

10. The optical switch according to claim 1, wherein the condensing means is set such that a spot of the signal light is smaller in size than a spot of the control light on a surface of the nonlinear optical thin-film.

11. The optical switch according to claim 1, wherein lights composed of the signal light and the control light are made incident upon the nonlinear optical thin-film along the same optical axis and a convergent optical element a refractive of which index is larger at a wavelength of the signal light than at a wavelength of the control light, is provided at the front side of the nonlinear optical thin-film to have the control light coming to a focus to rearward of an incident-side surface of the nonlinear optical thin-film.

12. The optical switch according to claim 1, further comprising temperature detection means for detecting a temperature of the nonlinear optical thin-film and cooling means for cooling the nonlinear optical thin-film.

13. The optical switch according to claim 1, wherein lights composed of the signal light and the control light are made incident upon the nonlinear optical thin-film along the same optical axis and a convergent optical element a refractive of which index is smaller at a wavelength of the signal light than at a wavelength of the control light, is provided at the front side of the nonlinear optical thin-film to have the control light coming to a focus to forward of a surface of the nonlinear optical thin-film.

14. An optical switching element comprising a nonlinear optical thin-film, high refractive-index transparent materials provided on both sides of the nonlinear optical thin-film with the nonlinear optical thin-film therebetween, an incident port which is provided on one of the high refractive-index transparent materials and through which a signal light and a control light are made incident upon the nonlinear optical thin-film, and output ports which are provided on the other of the high refractive-index transparent materials and through which the signal light is taken out as output signals in the form of a transmitted light and a reflected light owing to change of the nonlinear optical thin-film in refractive index, which is caused by irradiation of the control light.

15. The optical switching element according to claim 14, wherein the incident port is provided in a position to make the signal light and the control light incident obliquely upon the nonlinear optical thin-film.

16. The optical switching element according to claim 14, wherein the high refractive-index transparent materials comprise condensing means for making the signal light and the control light incident obliquely upon the nonlinear optical thin-film along different optical axes, and the control light is made incident at a larger angle relative to a normal line to the nonlinear optical thin-film via the condensing means than the signal light is.

17. The optical switching element according to claim 14, wherein the high refractive-index transparent materials comprise condensing means for making the control light incident at a smaller angle relative to a normal line to the nonlinear optical thin-film than the angle at which the signal light is made incident, and a film thickness of the nonlinear optical thin-film is made smaller than a major axis diameter of a spot of the control light on a surface of the nonlinear optical thin-film.

18. The optical switching element according to claim 14, wherein optical fibers are connected to one of the high refractive-index transparent materials to permit the signal light and the control light to be made incident upon the nonlinear optical thin-film, and a fiber for inputting the control light is larger in core diameter than a fiber for inputting the signal light.

19. The optical switching element according to claim 14, wherein the incident port comprises condensing means for making the signal light and the control light incident perpendicularly upon an incident surface of the high refractive-index transparent materials, the output port for outputting the reflected light is provided on an incident surface side of the high refractive-index transparent materials, the output port for outputting the transmitted light is provided on the other side of the high refractive-index transparent materials, and the both output ports are provided perpendicular to the output surfaces to have parallel beams of light output.

20. The optical switching element according to claim 14, wherein temperature detection means and cooling means are provided on at least one of lamination surface sides of the high refractive-index transparent materials or the optical substrate transparent materials, or on a side except the incident side and the output side.

21. An optical switching method comprising making a signal light and a control light incident upon a nonlinear optical thin-film, and taking out a transmitted light and a reflected light of the signal light as output signals owing to change of the nonlinear optical thin-film in refractive index, which is caused by irradiation of the control light.

22. The optical switching method according to claim 21, wherein the nonlinear optical thin-film is provided between high refractive-index transparent materials and optical substrate transparent materials, the signal light and the control light are made incident upon one of the high refractive-index transparent materials or the optical substrate transparent materials, a transmitted light of the signal light is taken out as an output from the other of the high refractive-index transparent materials or the optical substrate transparent materials, and a reflected light of the signal light is taken out as an output from one of the high refractive-index transparent materials or the optical substrate transparent materials.

23. An optical switching element comprising a nonlinear optical thin-film, optical substrate transparent materials provided on both sides of the nonlinear optical thin-film with the nonlinear optical thin-film therebetween, an incident port which is provided on one of the optical substrate transparent materials and through which a signal light and a control light are made incident upon the nonlinear optical thin-film, and output ports which are provided on the other of the optical substrate transparent materials and through which the signal light is taken out as output signals in the form of a transmitted light and a reflected light owing to change of the nonlinear optical thin-film in refractive index, which is caused by irradiation of the control light, and one of the optical substrate transparent materials is provided with a waveguide, by which lights composed of the signal light and the control light are gradually decreased in diameter toward the nonlinear optical thin-film, the other of the optical substrate transparent materials being provided with a waveguide, through which the transmitted light is output.

* * * * *